Figure 1:
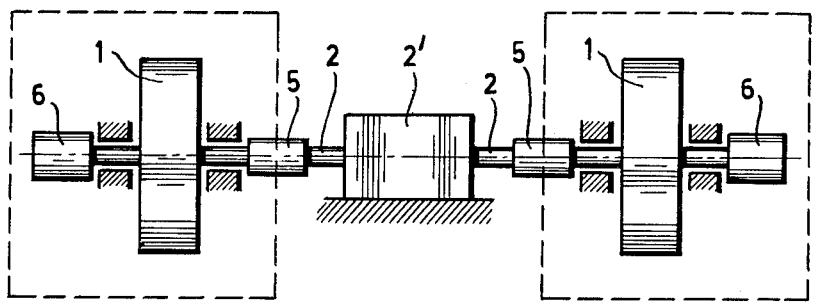

United States Patent [19]
Geul

[11] 3,952,589
[45] Apr. 27, 1976

[54] APPARATUS FOR TESTING A WHEELED VEHICLE

[75] Inventor: Herman Robert Geul, Leiden, Netherlands

[73] Assignee: Sun Electric Corporation, Chicago, Ill.

[22] Filed: Dec. 18, 1974

[21] Appl. No.: 534,152

[30] Foreign Application Priority Data
Dec. 20, 1973 Netherlands.................. 7317442

[52] U.S. Cl.................................. 73/117; 73/123
[51] Int. Cl.² ........................................ G01L 5/28
[58] Field of Search................. 73/117, 126, 123

[56] References Cited
UNITED STATES PATENTS

| | | | |
|---|---|---|---|
| 1,669,584 | 5/1928 | Wilkes | 73/123 |
| 1,755,287 | 4/1930 | Donavan | 73/126 |
| 3,554,023 | 1/1971 | Geul | 73/117 |
| 3,602,042 | 8/1971 | Mitchell | 73/126 |

Primary Examiner—James J. Gill
Assistant Examiner—Anthony V. Ciarlante
Attorney, Agent, or Firm—Allegretti, Newitt, Witcoff & McAndrews

[57] ABSTRACT

The disclosure describes an improved apparatus for testing a wheeled vehicle utilizing wheel-supporting rollers. All the wheel-supporting rollers are constrained to rotate at the same peripheral speed. Means are provided for measuring the angular acceleration or deceleration of the rollers.

5 Claims, 2 Drawing Figures

APPARATUS FOR TESTING A WHEELED VEHICLE

This invention relates to an apparatus for testing a wheeled vehicle, the apparatus being of the type providing a plurality of rollers for supporting the vehicle wheels and hence the vehicle, so that certain aspects of the vehicle's performance, for example, braking, may be tested while the vehicle wheels are rotating, without the necessity of the vehicle itself being placed in motion.

Apparatus of this kind is known in various forms, the various wheel supporting rollers being generally connected by a transmission system intended to ensure that each of the wheel supporting rollers has the same peripheral speed, means being provided for measuring the latter speed, and torque measuring devices being provided for measuring the torques exerted on the wheel supporting rollers, for example, by braking the wheels of the vehicle supported thereof. Because the forces exerted on the vehicle supporting rollers, for example, by braking the wheels of the vehicle supported thereon, not only exert torques at the torque measuring devices but bring about angular declarations of accelerations of the wheel supporting rollers, which inevitably have significant moments of inertia it is necessary to measure the angular deceleration or acceleration of the wheel supporting rollers if an accurate assessment is to be made of the forces exerted by the vehicle wheels, so that the known testing apparatus of the above kind generally also includes means for measuring the angular acceleration or deceleration of the wheel supporting rollers.

A simple, known form of testing apparatus of the above kind, comprises two rollers, in the form of flywheels, interconnected by a mechanical transmission system including a gearbox connected to a prime mover for driving the rollers, the gearbox having two output shafts, each connected to a respective one of the flywheels, via a respective torque measuring device and means being provided for measuring the angular acceleration or deceleration of one of the two flywheels.

In principle the torque externally exerted on each of the two flywheels can be calculated on the basis of the formula:

$$M_u - M_i = I\varphi$$

wherein:
- $M_u$ = torque externally exerted on the flywheel concerned (e.g. by a braked vehicle wheel);
- $M_i$ = torque measured by the torque measuring device of the output shaft to which the flywheel concerned is secured;
- $I$ = moment of inertia of the flywheel concerned and the part of the associated shaft extending from that flywheel to the respective torque measuring device;
- $\varphi$ = measured angular acceleration.

However, inaccuracies in the determination of the forces exerted on the flywheels by the vehicle wheels arise as a consequence of imperfections of manufacture in the gearbox causing fluctuation in the rotational speeds of the flywheels and causing rotational oscillatory motions of the two flywheels with respect to each other, thereby causing corresponding variations in the measured torques.

Furthermore, in this known form of testing apparatus the system consisting of the flywheels, angular acceleration meter, and the gearbox with the two output shafts has in general a rather low natural frequency of oscillation. Where the external forces applied to the flywheels are of a periodic nature differences in phase and amplitude can arise between the variations in velocity of the two flywheels, particularly since the system is not symmetrical with respect to the two flywheels, (since the angular acceleration measuring device is fitted to only one of the flywheels and incorporates a resilient element), when the natural frequency of the system and the frequency of the external forces applied are similar, the differences in phase and amplitude in the velocity variations in the two flywheels can be considerable.

For the aforementioned reasons, an incorrect calculation may be made of the external load of the flywheel which is not directly connected with the angular acceleration meter. Similar problems arise with more complex apparatus capable of testing four wheels of a vehicle at a time.

While, as indicated above, in order to simulate the performance of a vehicle on the road in the best possible way the wheel supporting rollers of a testing apparatus of the kind first mentioned should rotate with circumferential velocities which are always identical, the fact that this is practically impossible owing to manufacturing imperfections and the elasticity of the transmission system may in many cases play an insignificant part or may not play a part at all. However, if a periodically fluctuating loading is applied to the rollers, for example, by the brakes of a vehicle supported on the apparatus operating intermittently in a periodic fashion, this periodic loading of the transmission system will then cause disturbing signals which are incorporated into the results of the measurement, but to which no physical significance in relation to the external loads applied by the vehicle wheels should be attached. Moreover, these disturbance signals do not occur to the same extent at the various locations whereat measurements are taken, so that a dependable test of the vehicle can only be obtained when the nature and the magnitude of the disturbance signals is exactly known at each measuring location. This renders the calculation extremely complicated and almost impossible.

It is an object of the present invention to provide an improved apparatus for testing a wheeled vehicle, in which the above mentioned difficulties are minimised.

According to the invention there is provided apparatus for testing a wheeled vehicle, comprising a plurality of wheel supporting units each adapted to support a respective wheel of a vehicle and each including at least one wheel supporting roller, the wheel supporting units each being coupled to a transmission system via a respective torque measuring device, said wheel supporting units and said transmission system being so constructed that all said wheel supporting rollers are constrained to rotate with the same peripheral speed as each other, and each said wheel supporting unit having a respective means for measuring the angular acceleration or deceleration of the wheel supporting roller or rollers of the unit.

In the apparatus according to the invention, each of said wheel supporting units is separate from the others, as far as measurement is concerned, so that variations in behaviour between such wheel supporting units do not lead to significant errors. As a consequence the measured values obtained for each wheel supporting unit can be directly compared with each other in a reliable way.

The torque measuring devices should preferably be directly connected to the associated wheel supporting rollers since as a result the natural frequencies of the individual wheel supporting units can be increased to a great extent.

Figure 2:
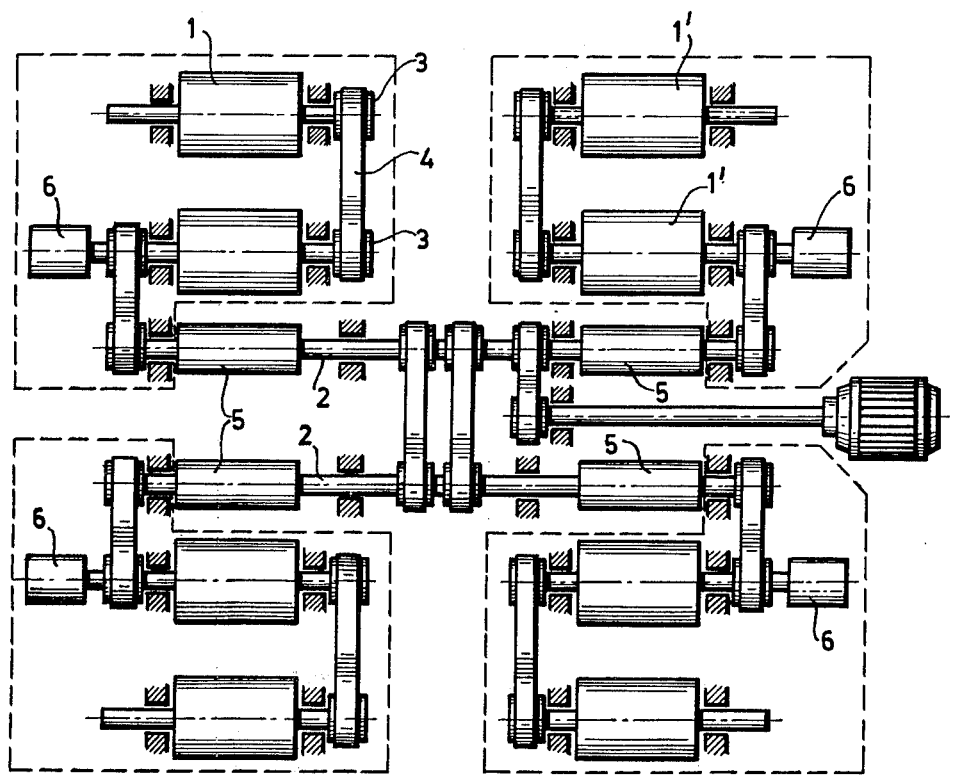

Embodiments of the invention are described below with reference to the accompanying drawings in which:

FIG. 1 shows diagrammatically a simple embodiment according to the invention of a vehicle testing apparatus, and FIG. 2 shows diagrammatically a more complex embodiment of a vehicle testing apparatus according to the invention, in the form of a roller test stand.

The apparatus according to FIG. 1 consists of two identical flywheels 1 which are connected to respective output shafts 2 of a gearbox 2' which is also connected to a driving motor (not shown) and is designed to drive both shafts 2 at the same mean speed. The gearbox 2' is conventional in construction so that it cannot be assumed that the rotational speed of either output shaft 2 is exactly the same from instant to instant, nor that both output shafts 2 will have exactly the same speed at any instant, as manufacturing imperfections, backlash in the gears, elasticity of shafts etc., may lead to short term variations in the speeds of the output shafts. That is to say, it cannot be assumed that the gearbox is "true to motion". The flywheels 1 are connected to the respective output shafts 2 via respective torque measuring devices 5 mounted on the output shafts 2. A respective angular acceleration measuring device 6 is connected to each of the two flywheels 1.

The apparatus of FIG. 1 thus consists essentially of two individual measuring systems which in FIG. 1 are framed within dotted lines. Each individual measuring system has a high natural frequency, namely that of the part of the output shaft 2 between the flywheel 1 and the torque measuring member 5. Due to this division into two separate systems problems, arising from the fact that the gearbox is not true to motion, are eliminated, for the gearbox 2' does not form part of either individual measuring system.

The peripheries of flywheels 1 preferably provide supporting surfaces for respective wheels of a vehicle, for example, a car, which is to be tested, for example, in respect of braking efficiency, the apparatus allowing the wheels of one axle of the vehicle to be tested at a time. Alternatively the flywheels 1 might be coupled by further transmission means to wheel supporting rollers.

In the roller test stand represented in FIG. 2 the parts corresponding with the parts of the device according to FIG. 1 are denoted by similar reference numerals.

The roller test stand has eight rotatably mounted rollers 1 arranged in pairs 1'. Each roller pair 1' forms part of a respective wheel supporting unit which can support a respective wheel of a vehicle (not shown) and simulate the road surface.

Each wheel suporting unit is shown in a respective area enclosed by a dotted line. The wheel supporting units for the front wheels of the vehicle are coupled via respective torque measuring devices 5 to a first shaft 2 while the wheel supporting units for the rear wheel supporting units are coupled via respective torque measuring devices 5 to a second shaft 2 parallel with the first and coupled thereto by toothed belt transmissions each comprising a toothed belt running over toothed wheels on the coupled shafts. The first shaft 2 is also coupled to an output shaft of a motor by a further toothed belt transmission. Each wheel supporting unit has its two rollers 1 interconnected by a toothed belt transmission comprising a toothed belt 4 and toothed wheels 3 and has one of its rollers 1 connected to the respective torque measuring device 5, and hence the respective shaft 2, by a further toothed belt transmission. The eight rollers are thus mutually coupled, so as to rotate all with the same mean rotational speed when driven by the motor. Each torque measuring device 5 measures the torque applied to the respective wheel supporting unit and each unit includes means for measuring the angular acceleration or deceleration of the rollers 1 thereof, this means comprising, for each unit, a respective tacho generator 6 connected to the shaft to which is fixed that roller 1 which is connected by the respective toothed belt transmission to the respective torque measuring device 5. The signal of each tacho generator, corresponding to the respective speed of rotation, is differentiated with respect to time, which results in a signal representing the angular acceleration or deceleration of the roller concerned. The part of the transmission system between each torque measuring device 5 and the associated tacho generator 6 has such a rigidity and has a natural frequency of oscillation which is so high, in relation to the fundamental frequency of oscillation of the transmission system as a whole, that the errors generated in this part are negligibly small. The system can be considered as a measuring arrangement thereby the torque acting between the transmission and the respective wheel supporting unit, and the angular acceleration of the respective roller pair 1' are measured at the same location.

The four units encircled in dotted lines in FIG. 2 may be considered as four individual measuring systems. Since each individual measuring system can be considered as a rigid body a good approximation in the measuring system concerned is that the difference between the torque as externally applied to the roller or rollers and the torque applied via the respective shaft 2 is equal to the product of the measured angular acceleration or retardation and the moment of inertia of the system concerned. With a suitable electronic computing device, into which the two measured magnitudes are introduced as input signals, the variation of the force externally exerted on the roller or roller pair can be calculated and registered independent of the disturbances arising outside the individual systems.

While the invention has been described in relation to a testing apparatus for a wheeled vehicle, the invention may be employed in any situation in which it is desired to measure forces applied at a plurality of positions by moving surfaces or the like, and for such other applications the transmission coupling the rollers need not provide for each roller the same rotational speed as each or any other said roller.

What I claim is:

1. Apparatus for testing a wheeled vehicle, comprising a plurality of wheel supporting units, each adapted to support a respective wheel of a vehicle and each including at least one wheel supporting roller, the wheel supporting units each being coupled to a transmission system via a respective torque meausuring device, said wheel supporting units and said transmission system being so constructed that all said wheel supporting rollers are constrained to rotate with the same peripheral speed as each other, and each said wheel supporting unit having a respective means for measuring the angular acceleration or deceleration of at least said one wheel supporting roller of the unit.

2. Apparatus according to claim 1 wherein each said means for measuring the angular acceleration or deceleration includes means for measuring the rotational speed of at least said one wheel supporting roller and means for deriving the respective acceleration or deceleration by differentiation with respect to time of the measured rotational speed.

3. Apparatus according to claim 1 wherein each said torque measuring device is directly connected to at least said one wheel supporting roller of the respective wheel supporting unit.

4. Apparatus according to claim 1 wherein each said torque measuring device is connected to at least said one wheel supporting roller of the respective wheel supporting unit via connecting elements which have a natural frequency of oscillation which is high in relation to the fundamental natural frequency of oscillation of the transmission system.

5. Apparatus according to claim 1, including a driving motor coupled to said transmission system for driving said wheel supporting rollers via said transmission system.

* * * * *